(12) United States Patent
Cramet et al.

(10) Patent No.: US 8,904,806 B2
(45) Date of Patent: Dec. 9, 2014

(54) PROCESS AND APPARATUS TO INCREASE THE TEMPERATURE GRADIENT IN A THERMAL GENERATOR USING MAGNETO-CALORIFIC MATERIAL

(75) Inventors: Nicolas Cramet, Strasbourg (FR); Jean-Louis Dupin, Muntzenheim (FR); Jean-Claude Heitzler, Horbourg-Wihr (FR); Christian Muller, Strasbourg (FR)

(73) Assignee: Cooltech Applications Societe Par Actions Simplifiee, Holtzheim (FR)

( * ) Notice: Subject to any disclaimer, the term of this patent is extended or adjusted under 35 U.S.C. 154(b) by 853 days.

(21) Appl. No.: 12/531,585

(22) PCT Filed: Mar. 13, 2008

(86) PCT No.: PCT/FR2008/000329
§ 371 (c)(1),
(2), (4) Date: Sep. 16, 2009

(87) PCT Pub. No.: WO2008/132342
PCT Pub. Date: Nov. 6, 2008

(65) Prior Publication Data
US 2010/0095686 A1   Apr. 22, 2010

(30) Foreign Application Priority Data
Mar. 19, 2007  (FR) ...................................... 07 01958

(51) Int. Cl.
*F25B 21/00*  (2006.01)

(52) U.S. Cl.
CPC ......... *F25B 21/00* (2013.01); *F25B 2321/0023* (2013.01); *Y02B 30/66* (2013.01); *F25B 2321/0022* (2013.01)
USPC .......................................................... 62/3.1

(58) Field of Classification Search
USPC ............................................... 62/3.1, 3.2, 3.3
See application file for complete search history.

(56) References Cited

U.S. PATENT DOCUMENTS

| 4,507,927 A | 4/1985 | Barclay |
| 5,361,587 A * | 11/1994 | Hoffman ......................... 62/3.2 |

(Continued)

FOREIGN PATENT DOCUMENTS

| EP | 1736717 A1 | 12/2006 |
| WO | 03009314 A1 | 1/2003 |

(Continued)

OTHER PUBLICATIONS

Peng Li et al., A Practical Model for Analysis of Active Magnetic Regenerative Refrigerators for Room Temperature Applications, ScienceDirect, Jul. 26, 2006, Beijing, China.
Tetsuji Okamura et al., Performance of a Room-Temperature Rotary Magnetic Regrigerator, ScienceDirect, Jul. 25, 2006, Midori-ku, Nagoya, Japan.

* cited by examiner

*Primary Examiner* — John F Pettitt
*Assistant Examiner* — Ignacio E Landeros
(74) *Attorney, Agent, or Firm* — Davis & Bujold, PLLC; Michael J. Bujold

(57) ABSTRACT

A method and an apparatus for increasing the temperature gradient of a magneto-calorific thermal generator comprising magneto-calorific elements subjected to a magnetic field variation. At least one of a pre-heating and pre-cooling of the magneto-calorific elements (60) is carried out to modify the initial temperature before and/or during the magnetic field variation before reaching the maximum and/or minimum field value. The method and apparatus may be employed in heating, tempering, air conditioning, refrigeration and other industrial or domestic applications.

17 Claims, 5 Drawing Sheets

(56) References Cited

U.S. PATENT DOCUMENTS

| | | |
|---|---|---|
| 6,588,216 B1 | 7/2003 | Ghoshal |
| 6,826,915 B2 | 12/2004 | Wada et al. |
| 7,481,064 B2 | 1/2009 | Kitanovski et al. |
| 2003/0051774 A1* | 3/2003 | Saito et al. ............... 148/302 |
| 2004/0231338 A1* | 11/2004 | Saito et al. ............... 62/3.1 |
| 2005/0000230 A1* | 1/2005 | Saito et al. ............... 62/3.1 |

FOREIGN PATENT DOCUMENTS

| | | |
|---|---|---|
| WO | 03016794 A1 | 2/2003 |
| WO | 2004059221 A1 | 7/2004 |
| WO | 2008012411 A1 | 1/2008 |

US 8,904,806 B2

PROCESS AND APPARATUS TO INCREASE THE TEMPERATURE GRADIENT IN A THERMAL GENERATOR USING MAGNETO-CALORIFIC MATERIAL

This application is a national stage completion of PCT/FR2008/000329 filed Mar. 13, 2008 which claims priority from French application serial no. 07/01958 filed Mar. 19, 2007.

TECHNICAL FIELD

The present invention concerns a process and a device for increasing the temperature gradient in a magneto-calorific thermal generator comprising: on the one hand, fixed magneto-calorific elements and magnetic means arranged to submit such magneto-calorific elements alternately to a variations of a magnetic field between a maximum field value and a minimum field value to make the temperature of the magneto-calorific elements vary; and on the other hand, means for collecting calories and/or frigories emitted by the magneto-calorific elements, these means including at least one circuit with at least one heat transfer fluid moving in a direction parallel to that of the magnetic field variation.

BACKGROUND OF THE INVENTION

These new thermal generators using the magneto-calorific effect of certain materials offer a very interesting environmentally friendly alternative to conventional generators destined to disappear within the context of sustainable development and greenhouse effect reduction. To ensure that these generators are cost-effective and energy efficient, it is theoretically possible to act on various parameters. One of those parameters is the intensity of the magnetic field. Indeed, the increase in the magnetic field leads to an increase in the responsiveness of magneto-calorific elements, which in turn increases the efficiency of the generator. In fact, significantly increasing the power of the magnets to increase the intensity of the magnetic field generated by these magnets often means, as is known, exorbitant cost, which is not acceptable from an economic point of view.

Another parameter that can theoretically be acted on is the temperature gradient of the magneto-calorific elements which is low since it is only a few degrees per Tesla and depends on the nature of the selected magneto-calorific materials. Indeed, increasing the temperature gradient within the magneto-calorific thermal generator effectively increases the calorific efficiency of the system. From an economic point of view, acting on this second parameter is more appealing given that the increase of the temperature gradient is far more economical than the increase of the magnetic field, which makes it more suitable to a wider industrial application. In the magneto-calorific generators described in publications EP1736717 and WO2004/05922, the thermal element is mobile and consists of a wheel of porous magneto-calorific material, with the magnet in a fixed position and arranged to create a magnetic field on a half-portion of the wheel, thus defining a magnetic area generating heat, and a non-magnetic area generating cold. The mobile thermal element is crossed axially by a hot heat transfer fluid circuit and by a cold heat transfer fluid circuit circulating in opposite directions and perpendicularly to the magnetic field, these circuits being connected to external circuits by rotating joints. The heat transfer fluid is mainly air with a thermal conductivity ratio of 1 to 30 compared to a liquid such as water and must therefore move at a speed much higher than the wheel's speed of rotation to recover thermal power. To improve the energy efficiency of such a generator, the thermal inertia generated by the hot heat transfer fluid which enters the cold zone and the cold heat transfer fluid which enters into the hot zone when the wheel spins must also be reduced by shifting the entrance of the hot fluid with respect to its entrance into the magnetic zone and the entrance of the cold fluid with respect to its entrance into the non-magnetic zone.

The generator described in the publication WO2008/012411, belonging to the same applicant, presents a reversed configuration with respect to the one described above. The thermal module is fixed, thus simplifying the design of the heat transfer fluid circuits, as there is no more need for rotating connections, and the magnets are mobile or arranged to create a mobile or variable magnetic field in relation to the fixed thermal module. One or more heat transfer fluids, which are predominantly a liquid such as water whose thermal conductivity is 30 times higher than that of a gas such as air, circulate radially into the thermal module in a direction parallel to that of the magnetic field and at approximately the same speed, to collect the hot or cold generated by the magneto-calorific elements as the displacement of magnets or variation of the magnetic field occur. To improve the energy efficiency of such a generator, the exchange surfaces are multiplied by piling several magneto-calorific elements in the form of plates, delimiting between them the circulation channels of the heat transfer fluid, like a mini or micro exchanger.

No known magneto-calorific generator proposes to act directly on the temperature gradient of the magneto-calorific elements as such.

SUMMARY OF THE INVENTION

The present invention aims to improve the energy efficiency of a magneto-calorific thermal generator as defined in the preamble by increasing its temperature gradient, while respecting the imposed economic constraints and producing an efficient generator, easy to build and maintain, inexpensive to acquire and use.

For this purpose, the process according to the invention is characterized in that at least one pre-heating and/or one pre-cooling of the magneto-calorific elements is performed to change their initial temperature before and/or during the magnetic field variation before reaching maximum or minimum field value.

The effect of this pre-heating and/or pre-cooling, whatever method is used, is to anticipate respectively the rise and fall of the temperature of the magneto-calorific elements when they are subjected to a magnetic field variation, which consequently increases the temperature gradient, hence improving system efficiency.

According to different implementation variants, one can use specific means of heating or cooling selected from the group consisting of infrared radiation generators, electrical resistance, Pelletier plates.

According to an advantageous method of implementation, when the heat transfer fluid is a liquid solution, in order to carry out at least one pre-heating and/or pre-cooling of the magneto-calorific elements, one uses the heat transfer fluid that is circulated in the circuit to collect the calories and/or frigories emitted by the magneto-calorific elements at a speed different from that of the magnetic field variation.

Because of this speed difference, the heat transfer fluid has a head start on the magnetic flux and has the effect of pre-heating or pre-cooling, according to the circuit in question, the magneto-calorific elements before their magnetization or demagnetization, thus increasing the temperature gradient between the entry and exit temperatures of the fluids.

According to a first advantageous method of process implementation in which a first heat transfer fluid circulates in a first collector circuit called "hot" and a second heat transfer fluid circulates in a second collector circuit called "cold", one can make the first heat transfer fluid circulate in the hot circuit at a speed greater than the speed of the magnetic field variation.

According to a second advantageous method of process implementation in which a first heat transfer fluid circulates in a first collector circuit called "hot" and a second heat transfer fluid circulates in a second collector circuit called "cold", one can make the second heat transfer fluid circulate in the cold circuit at a speed greater than the speed of the magnetic field variation.

One advantageously varies the circulation speed of the first heat transfer fluid in the hot circuit by means of a circulation pump driven by a control box and one advantageously varies the circulation speed of the second heat transfer fluid in the cold circuit by means of a circulation pump driven by a control box.

Finally, one can have the heat transfer fluid circulate in the circuit to collect calories and/or frigories emitted by the magneto-calorific elements at a speed different from the speed of the magnetic field variation by modulating the moving speed of the magnetic field.

For this purpose as well, the device according to the invention is characterized in that it includes the means to carry out at least one pre-heating and/or pre-cooling of the magneto-calorific elements to change their initial temperature before and/or during the magnetic field variation before reaching the maximum or minimum field value.

According to different implementation variants, the device may include specific means of heating or cooling selected from the group consisting of infrared radiation generators, electrical resistance, Pelletier plates.

In a preferred implementation method, when the heat transfer fluid is a liquid solution, the device includes means to make the heat transfer fluid circulate in the circuit to collect the calories and/or frigories emitted by the magneto-calorific elements at a speed different from the speed of the magnetic field variation.

According to a first advantageous manner of implementing the invention, the device which includes a first collector circuit called "hot" in which a first heat transfer fluid circulates and a second collector circuit called "cold" in which a second heat transfer fluid circulates, includes means to make the first heat transfer fluid circulate in the hot circuit at a speed greater than the speed of the magnetic field variation.

According to a second advantageous manner of implementing the invention, the device which includes a first collector circuit called "hot" in which a first heat transfer fluid circulates and a second collector circuit called "cold" in which a second heat transfer fluid circulates, includes means to make the second heat transfer fluid circulate in the cold circuit at a speed greater than the speed of the magnetic field variation.

According to a particularly advantageous implementation method, the hot circuit includes a circulation pump driven by a control box and the cold circuit includes a circulation pump driven by a control box.

According to another implementation form, the thermal generator includes a rotary shaft bearing magnetic assemblies and an actuator equipped to control the driving speed of the shaft and create a magnetic field variation speed different from the circulation speed of the heat transfer fluid.

BRIEF DESCRIPTION OF DRAWINGS

The present invention and its advantages will be more apparent from the following description of an embodiment given as a non-limiting example and referring to the attached drawings, in which.

DETAILED DESCRIPTION OF THE INVENTION

Figure 1:
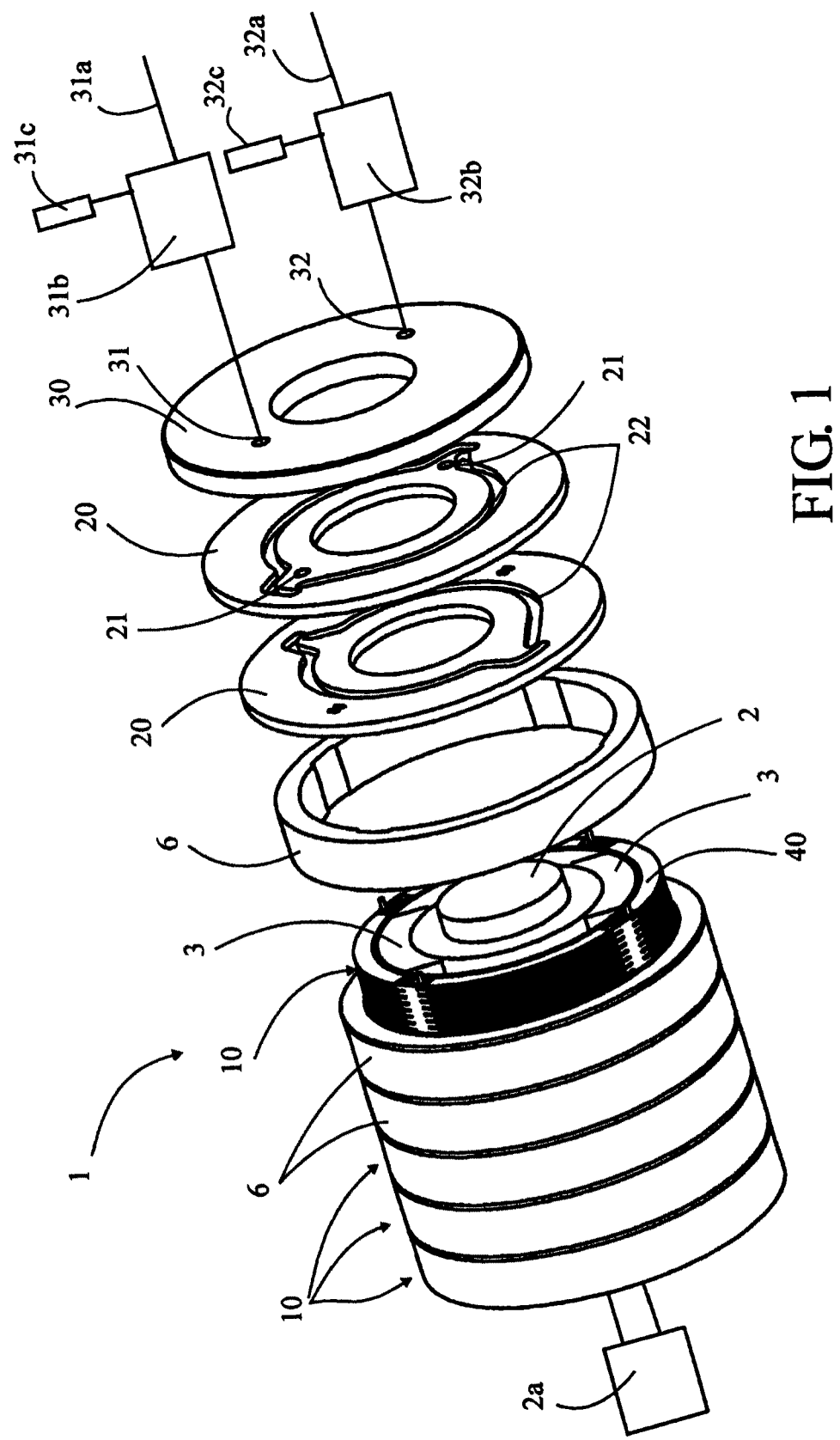
FIG. 1 is an exploded view of a particular form of embodiment of a thermal generator according to the invention.
Figure 3:
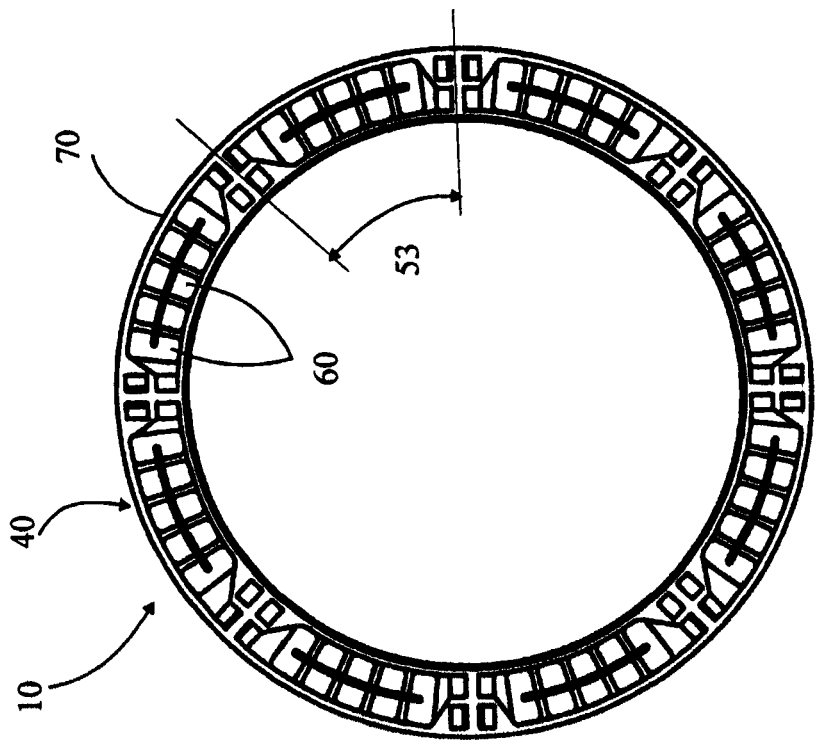
FIG. 3 is a top view of a form of implementation of magneto-calorific elements carrier for the thermal generator, according to the invention.
Figure 2:
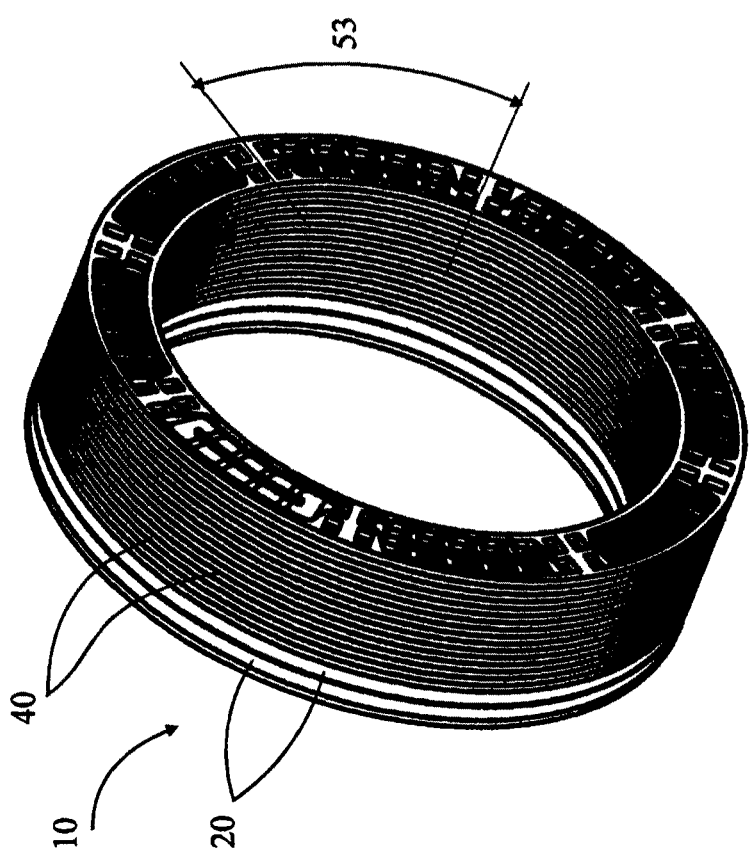
FIG. 2 is a perspective view of a thermal module example suitable for the implementation of the generator in FIG. 1.

The process to increase the temperature gradient in a magneto-calorific thermal generator according to the invention may, for instance, but not exclusively, be applied to a magneto-calorific thermal generator as described in the publication WO2008/012411 and as represented in FIGS. 1 to 3. This example is not limited and the process can be extended to any other type of magneto-calorific generator, wherein the magnetic means are mobile or arranged to create a mobile or variable magnetic field with respect to the magneto-calorific elements which are fixed, and in which the heat transfer fluid or fluids, which are predominantly a liquid such as water, circulate in a direction parallel to the movement or variation of the magnetic field and approximately at the same speed to collect the heat or the cold generated by the magneto-calorific elements as they occur.

The magneto-calorific thermal generator 1 represented by FIGS. 1 to 3 comprises for example a set of stacked thermal modules 10, connected by distributor discs 20 and closed by sealing flanges 30 mounted on both sides of the pile. The number of thermal modules 10 is variable and their form of implementation can be modified based on the desired performance. Each thermal module 10 consists of supports 40 carrying a set of magneto-calorific elements 60, these supports 40 being stacked axially and arranged to delimit between them radially oriented circulation channels for one or more heat transfer fluids corresponding to one or more collector circuits. One can notably vary the operating temperature range of the magneto-calorific elements 60 depending on the nature, such as the chemical composition of these materials, as well as the pressure and speed of movement of the heat transfer fluids depending on the section of the channels in which these fluids circulate and/or on their pressure.

The sealing flange 30 represented comprises, for instance, two openings 31, 32 designed to be connected respectively to an external hot collector circuit 31a and to an external cold collector circuit 32a (shown schematically), which respectively convey the calories and the frigories produced by the generator 1. These collector circuits 31a, 32a each comprise means to make each heat transfer fluid circulate in the corresponding circuit to respectively collect the calories and/or frigories emitted by the magneto-calorific elements 60. In this case, these means may include a circulation pump, 31b and 32b respectively, or any other equivalent element. These means are respectively controlled by control boxes 31c and 32c arranged to modulate the speed of movement of the heat transfer fluid in both circuits 31a and 32a according to the user's request. This request can be programmed in or carried out punctually as needed.

The distributor discs 20 comprise openings 21 and distribution grooves 22 allowing the connection together in series, in parallel, or in a series/parallel combination of the respectively hot and cold circuits of the various thermal modules 10 with each other and with the external collector circuits 31a, 32a respectively hot and cold. These distributor discs 20 can be arranged in pairs, each disc being assigned to one of the collector circuits. They may also be formed from double-sided single discs (not represented) with a particular arrangement of openings 21 and distribution grooves 22 in order to implement a similar function.

In the example represented, the thermal generator 1 comprises a central shaft 2 carrying two diametrically-opposed magnetic assemblies 3, and rotated by an actuator 2a, an electric motor for instance. In the example represented, this actuator 2a is arranged to drive the magnetic assemblies 3 in rotation, but the motion could equally be done in translation. In addition, although it is preferentially continuous, the motion can also be discontinuous, reciprocating or defined according to a complex program as needed. The number, location and type of magnetic assemblies 3 can be determined based on the construction of the thermal modules 10. These magnetic assemblies 3 can be formed from permanent magnets, electromagnets, superconductors or any other type of magnet. The preferred choice is permanent magnets due to their advantages in terms of size, simplicity of use and low cost. These permanent magnets may be solid, sintered, glued or laminated, associated with one or more magnetisable materials which concentrate and direct their magnetic field lines. The thermal modules 10 can be surrounded by an armature 6 made preferably from a ferromagnetic material whose main function is to close the magnetic flux generated by the magnetic assemblies 3. The thermal modules 10 can be assembled by tightening using any known means such as, for example, tie rods (not represented) extending between the two sealing flanges 30, or clamps (not represented) mounted on the shaft 2 by means of bearings. Any other mode of assembly can be envisaged, the essential factor being to mechanically maintain the thermal modules 10 between each other and to seal the generator's internal hot and cold collector circuits.

In the example illustrated, the thermal generator 1 presents a circular configuration, i.e. the thermal modules 10 are annular and arranged around a shaft 2 carrying the magnetic assemblies 3. However, the invention also extends to a thermal generator having a rectilinear configuration (not represented) in which the thermal modules are arranged in a linear manner and the magnetic means are driven in a reciprocating or sequential movement.

In the example represented, each support 40 comprises a set of successive magneto-calorific elements 60 supported by a support 70, the area occupied by magneto-calorific elements 60 accounting for a majority compared to that of the support 70. These magneto-calorific elements 60 are parallel to the circulation direction of the fluid and to the motion of the magnets. They have the shape of a circular sector and are made for example from cut, machined or cast magneto-calorific material. The choice of the magneto-calorific materials is made according to the required heating or cooling power and the necessary operating temperature ranges.

The supports 40 may have different configurations. On FIG. 3, the support 40 comprises several distinct yet identical thermal sectors 53, covering approximately 45°, each composed of the same number of magneto-calorific elements 60, this configuration not being limitative. Similarly, these magneto-calorific elements 60 in the form of circular sectors may have any geometric shape and their composition can be varied depending in particular on the required temperature ranges. This example is not restrictive. The support 40 may also be a part cast in a synthetic material loaded with magneto-calorific material particles.

The present invention proposes to increase the temperature gradient of the magneto-calorific elements 60 by pre-heating or pre-cooling them with all appropriate means to modify their initial temperature and anticipate the magnetization and demagnetization cycles.

One of the solutions described in detail below consists of using the heat transfer fluid as a pre-preheating or pre-cooling element of the magneto-calorific elements by shifting the circulation speed of the fluid with respect to that of the magnetic field, which can be done in the generator kind of the invention since the fluid circulates in a direction parallel to the magnetic field, and which is impossible to carry out in the kind of generator described in publications EP1736717 and WO2004/05922. This solution is very advantageous since it allows to discard all other additional means of heating and/or cooling.

According to the present invention, heat transfer fluid is made to circulate in the thermal module 10 to collect calories and/or frigories emitted by said magneto-calorific elements 60 at a speed greater than the speed of intensity variation of magnetic field, to anticipate magnetization and demagnetization cycles of the magneto-calorific elements 60.

As a general rule, when a magneto-calorific element 60 penetrates the magnetic field, its temperature moves from an initial value of Ti to a final value of Tf=Ti+ΔT. The value of the temperature gradient ΔT is constant for a given magnetic field intensity and for a determined composition of the magneto-calorific material.

Figure 4:
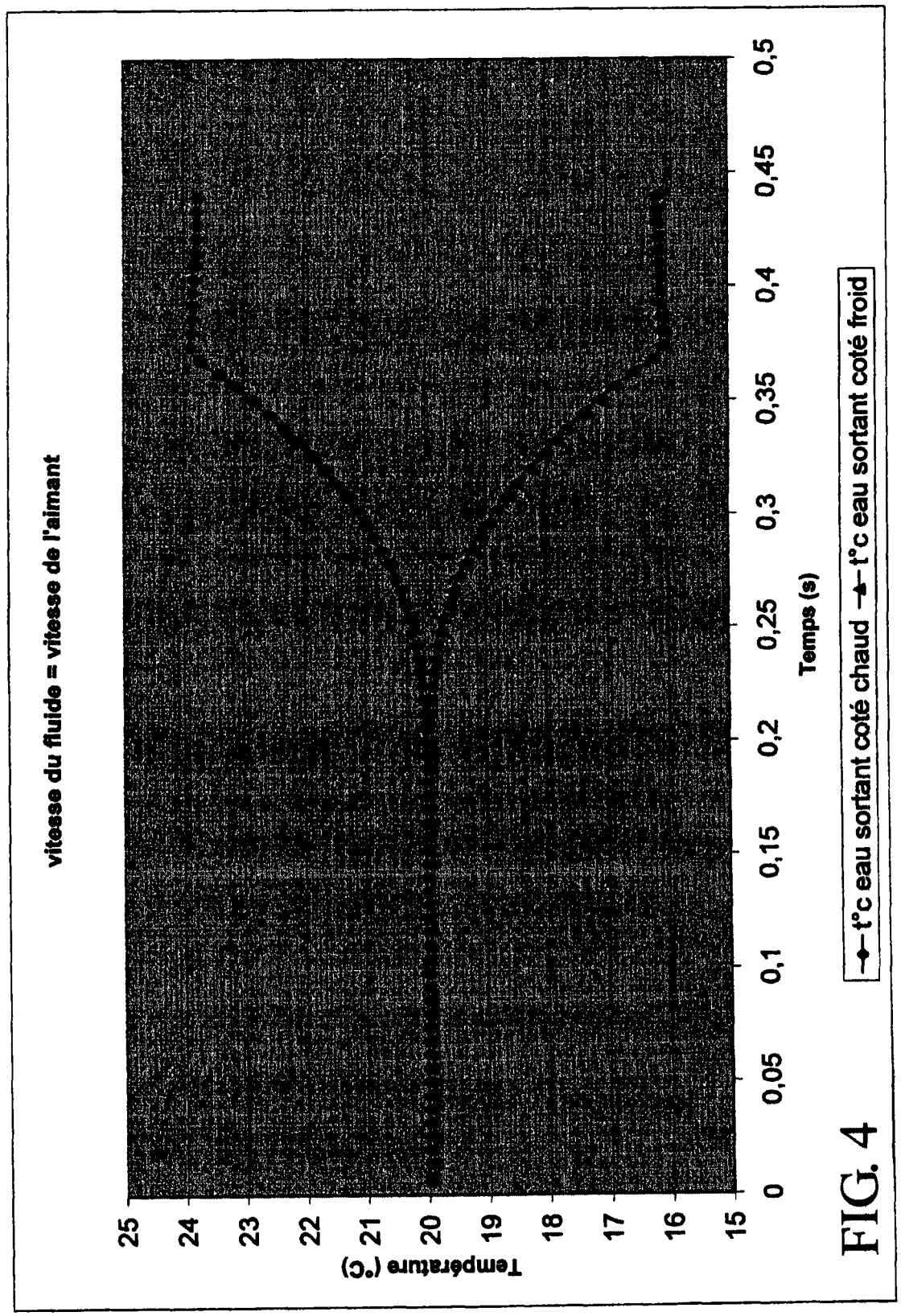
FIG. 4 is a temperature graph in relation to the heat transfer fluid time in the hot and cold circuits when the speed of the fluid is equal to the speed of the magnets, in accordance with the state of the art.

If the circulation speed of the heat transfer fluid and the relative motion speed of the magnetic field are identical or synchronized, temperature gradient ΔT of all the magneto-calorific elements 60 during their passage through the magnetic field will remain the same for the whole of these elements and the heat transfer fluid will reach an exit temperature gradient of ΔTs, equal for instance to 3.8° C., as shown in FIG. 4.

Figure 5:
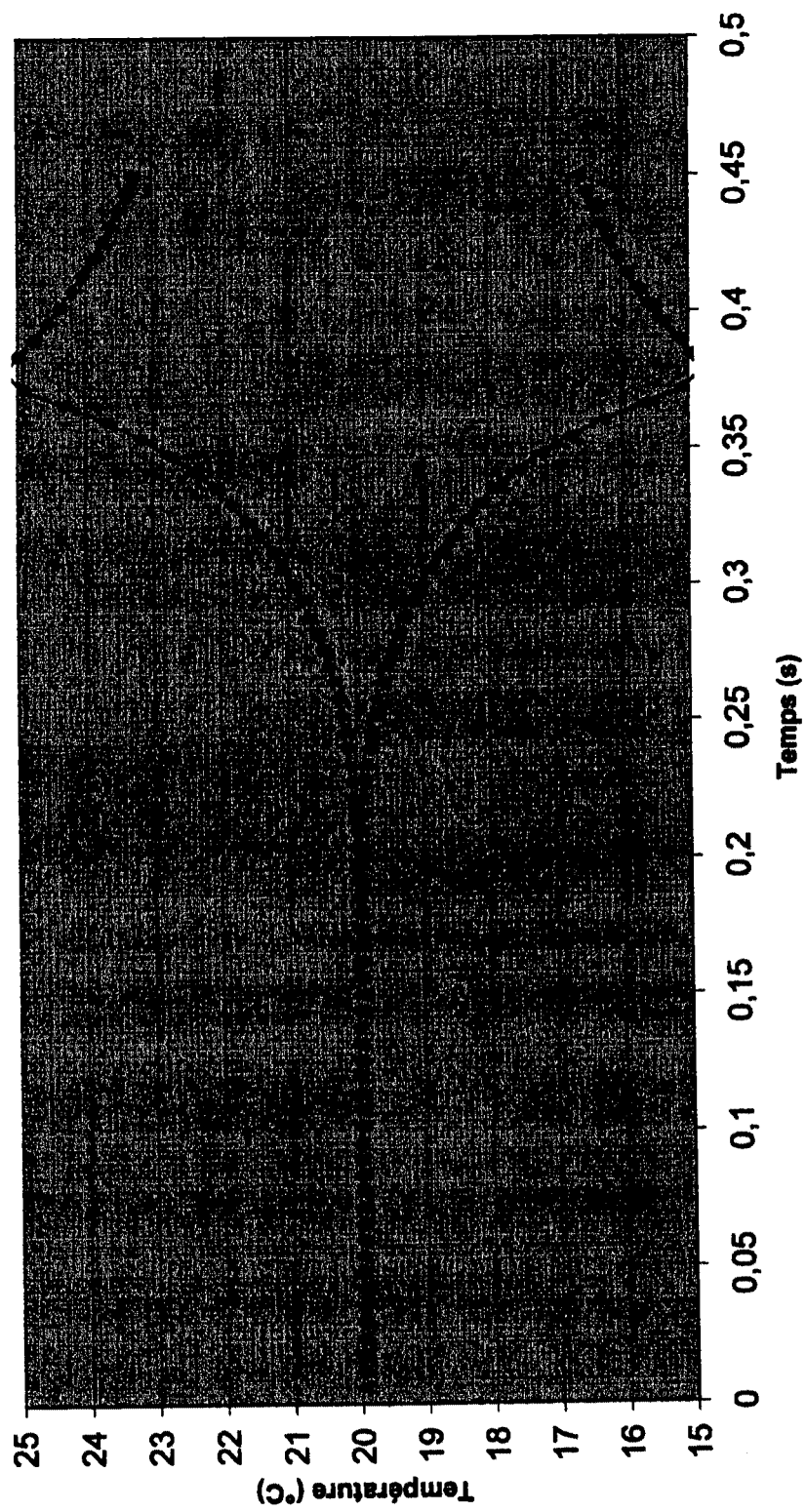
FIG. 5 is a graph similar to that of FIG. 4 when the speed of the fluid is greater than the speed of the magnets, according to the invention.

On the other hand, if the magneto-calorific elements 60 are pre-heated before or during their passage through the magnetic field, and/or pre-cooled before or during their passage out of the magnetic field, by circulating the heat transfer fluid at a speed higher or shifted with respect to the relative motion speed of the magnetic field, the temperature gradient of all the magneto-calorific elements 60 will grow for the whole of these elements, and the heat transfer fluid will reach an exit temperature gradient ΔTs+ greater than the preceding ΔTs, equal for instance to 5.3° C., as shown in FIG. 5.

Figure 6A:
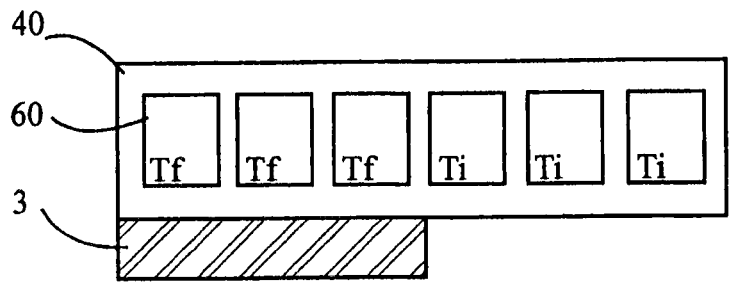
FIGS. 6A and 6B are diagrams illustrating the operation of magneto-calorific elements without pre-heating, in accordance with the prior art.
Figure 6B:
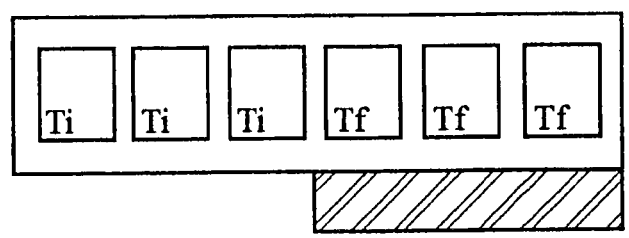

Indeed, if the initial temperature Ti of a magneto-calorific element 60 that penetrates the magnetic field was, for instance, 20° C. and if the ΔT had a constant value of 1° C., the final value Tf of this magneto-calorific element 60 would be 21° C. In the known thermal generators of this type, the following magneto-calorific elements 60 would all have the same initial temperature Ti of 20° C. at their entrance into the magnetic field and the same final temperature Tf of 21° C. at their exit from the field. This phenomenon is schematically represented in FIGS. 6A and 6B. In this example, the initial temperature of the magneto-calorific elements 60 that are not subjected to the magnet 3 is the same and equal to Ti for all the elements. When they are subjected to the magnet 3 their final temperature rises to the same value, which is equal to Tf for all elements, the difference between Tf and Ti corresponding to the temperature gradient ΔT determined by the nature of the magneto-calorific material used.

Figure 7A:
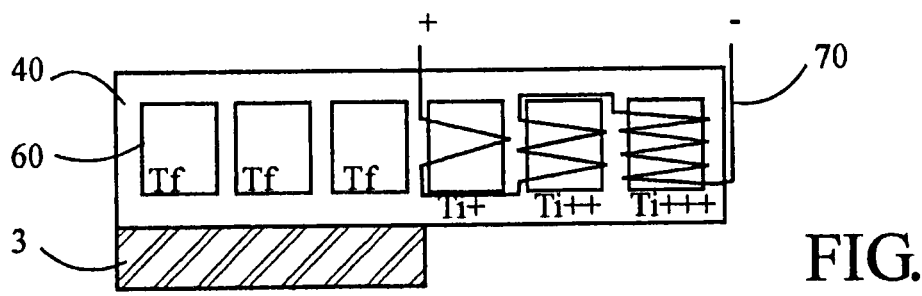
FIGS. 7A and 7B are diagrams illustrating the operation of magneto-calorific elements with pre-heating according to the invention.
Figure 7B:
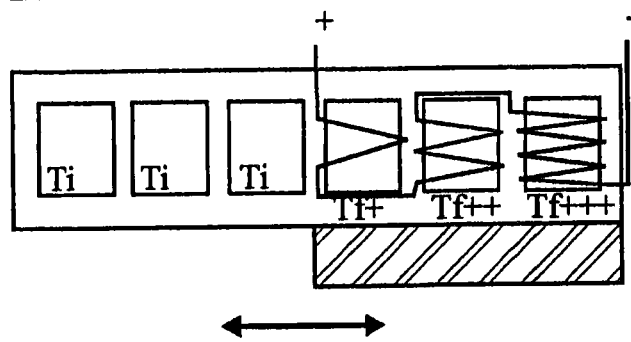

In the thermal generator of the invention, even if the initial temperature Ti of the first magneto-calorific element that penetrates the magnetic field was 20° C. and if its final temperature was 21° C., the initial temperature Ti+ of the second magneto-calorific element, which has undergone pre-heating, would be greater than Ti. If the pre-heating was done, for instance, by means of the hot circuit, this initial temperature would be equal to the final temperature Tf of the first magneto-calorific element, or 21° C. With three successive elements, the final temperature of the third magneto-calorific element could be close to 23° C., so that the temperature gradient ΔT between the first and the third elements would, in this case, be 3° C. and not 1° C. as in known generators. This phenomenon is schematically illustrated in FIGS. 7A and 7B where the pre-heating of the magneto-calorific elements 60 is represented by an electrical resistance, whose number of turns determines the number of degrees given to each element. In this example, and thanks to the pre-heating, the initial temperature of the magneto-calorific elements 60 not subjected to the magnet 3 is Ti+, Ti++ and Ti+++, where Ti+<Ti++<Ti+++ respectively. When they are subjected to the magnet 3 their final temperature changes respectively to Tf+, Tf++ and Tf+++, where Tf+<Tf++<Tf+++. For a same individual temperature gradient ΔT determined by the nature of the magneto-calorific material used, the temperature gradient ΔT between the entrance and the exit from the magnetized zone will therefore be a few degrees greater according to the prior art (see FIGS. 6A, 6B). This phenomenon can, of course, also be applied to the cooling cycle by using the cold circuit to pre-cool the magneto-calorific elements 60.

Of course, the pre-heating and pre-cooling of the magneto-calorific elements 60 could be performed by any other additional or specific means of heating and/or cooling rather than using the heat transfer fluids from the hot and cold circuits. Infrared radiation generators, electrical resistance, Pelletier plates, or equal means from a functional point of view could be used. It is also possible to combine the pre-heating and pre-cooling of the magneto-calorific elements 60 to a combination of magneto-calorific materials different in nature and, thus, of different temperature gradients ΔT.

Similarly, magnetic field variation can be achieved by a present or absent magnetic field depending on the position of the magnets with respect to the magneto-calorific elements 60 as in the example represented, or by a magnetic field modulated by any means known between a maximum field value and a minimum field value, the magnets being fixed or mobile.

In the example represented, the control of the motion speed of the magnetic field is carried out through the actuator 2a and the control of the circulation speed of the heat transfer fluids from the hot 31a and cold 32a circuits, respectively, is carried out through circulation pumps, 31b and 32b respectively, driven by control boxes 31c and 32c, possibly programmable or controlled by sensors. Any other method of implementation is possible.

The present invention is not restricted to the examples of embodiment described, but extends to any modification or variant which is obvious to a person skilled in the art while remaining within the scope of the protection defined in the attached Claims.

The invention claimed is:

1. A method of increasing a temperature gradient in a magneto-calorific thermal generator (1) comprising fixed magneto-calorific elements (60) and magnetic means (3) capable of moving, relative to the magneto-calorific elements (60), to alternately supply the magneto-calorific elements to a magnetic field variation between a maximum field value and a minimum field value to change a temperature of the magneto-calorific elements (60), and collector means for collecting at least one of calories and frigories emitted by the magneto-calorific elements (60), the collector means comprising at least one collector circuit (31a, 32a) with at least one heat transfer fluid circulating in at least one circulation channel of the magneto-calorific elements (60), the method comprising the steps of:
    circulating the heat transfer fluid in the collector circuit in a direction parallel to the movement of the magnetic means (3); and
    circulating the heat transfer fluid in the collector circuit (31a, 32a) at a circulation speed that is greater than the speed of motion of the magnetic means so as to at least one of pre-heating of the magneto-calorific elements (60) of a thermal module (10) to modify an initial temperature of the magneto-calorific elements (60) at least one of before and during the magnetic field variation, before reaching the maximum field value in the thermal module (10), and pre-cooling of the magneto-calorific elements (60) of the thermal module (10) to modify an initial temperature of the magneto-calorific elements (60) at least one of before and during the magnetic field variation, before reaching the minimum field value in the thermal module (10).

2. The method according to claim 1, further comprising the step of arranging the magneto-calorific elements (60) in a shape of a circular sector around a central shaft (2) which carries the magnetic means (3) and facilitates rotation of the magnetic means (3).

3. The method according to claim 1, further comprising the step of circulating a first heat transfer fluid in a first collector circuit (hot) and circulating a second heat transfer fluid in a second collector circuit (cold), with the first heat transfer fluid circulating within the first collector circuit at a circulation speed that is greater than the speed of motion of the magnetic means.

4. The method according to claim 3, further comprising the step of varying the circulation speed of the first heat transfer fluid, in the first collector circuit, via a circulation pump (31b) driven by a control box (31c).

5. The method according to claim 1, further comprising the step of circulating a first heat transfer fluid in a first collector circuit (hot) and circulating a second heat transfer fluid in a second collector circuit (cold), with the second heat transfer fluid circulating within the second collector circuit at a circulation speed that is greater than the speed of motion of the magnetic means.

6. The method according to claim 5, further comprising the step of varying the circulation speed of the second heat transfer fluid in the second collector circuit via a circulation pump (32b) driven by a control box (32c).

7. The method according to claim 1, further comprising in the step of circulating the heat transfer fluid in the collector circuit to collect at least one of the calories and the frigories emitted by the magneto-calorific elements (60) at a circulation speed that is greater than a speed variation of the magnetic field by modulating a speed of motion of the magnetic means.

8. The device according to claim 1, further comprising the step of measuring the circulation speed as a linear speed of movement of the heat transfer fluid.

9. A device for increasing a temperature gradient in a magneto-calorific thermal generator (1) comprising fixed magneto-calorific elements (60) and magnetic means (3) capable of moving relative to the magneto-calorific elements (60) to alternately submit the magneto-calorific elements (60) to a magnetic field varying between a maximum field value and a minimum field value to change the temperature of the magneto-calorific elements (60), and collection means for collecting at least one of calories and frigories emitted by the magneto-calorific elements (60), the collection means comprising at least one circuit (31a, 31b) with at least one heat transfer fluid circulating in at least one circulation channel of the magneto-calorific elements (60),
wherein the heat transfer fluid circulates in a direction parallel to the movement of the magnetic means (3) and the heat transfer fluid circulates in the collector circuit (31a, 32a) at a circulation speed that is greater than the speed of motion of the magnetic means so as to at least one of pre-heating of the magneto-calorific elements (60) of a thermal module (10) to modify an initial temperature of the magneto-calorific elements (60) at least one of before and during the magnetic field variation before reaching a maximum field value, and pre-cooling of the magneto-calorific elements (60) of the thermal module (10) to modify an initial temperature of the magneto-calorific elements (60) at least one of before and during the magnetic field variation before reaching a minimum field value in the thermal module (10).

10. The device according to claim 9, wherein a first heat transfer fluid circulates in a first collector circuit (hot) and a second heat transfer fluid circulates in a second collector circuit (cold), and the circulation means circulates the first heat transfer fluid circulate within the first collector circuit (hot) at a circulation speed that is greater than the speed of motion of the magnetic means.

11. The device according to claim 9, wherein a first heat transfer fluid circulates in a first collector circuit (hot) and a second heat transfer fluid circulates in a second collector circuit (cold), and the circulation means circulates the second heat transfer fluid circulate within the second collector circuit (cold) at a circulation speed that is greater than the speed of motion of the magnetic means.

12. The device according to claim 11, wherein the second collector circuit (cold) comprises a second circulation pump (32b) driven by a control box (32c).

13. The device according to claim 10, wherein the first collector circuit (hot) comprises a first circulation pump (31b) driven by a control box (31c).

14. The device according to claim 9, wherein the thermal generator (1) comprises a rotating shaft (2) carrying magnetic assemblies (3) and an actuator (2a) arranged to control a driving speed of the shaft (2) and create a magnetic field variation speed that is less than the circulation speed of the heat transfer fluid.

15. A method of increasing a temperature gradient in a magneto-calorific thermal generator (1) comprising fixed magneto-calorific elements (60) and magnetic mechanism (3) arranged to alternately supply the magneto-calorific elements to a magnetic field variation between a maximum field value and a minimum field value to change a temperature of the magneto-calorific elements (60), and collecting mechanism for collecting at least one of calories and frigories emitted by the magneto-calorific elements (60), the collecting mechanism comprising at least one collector circuit (31a, 32a) with at least one heat transfer fluid circulating in at least one circulation channel of magneto-calorific elements (60), the method comprising the step of:
circulating the heat transfer fluid in the collector circuit in a direction parallel to the movement of the magnetic means (3); and
circulating the heat transfer fluid in the collector circuit (31a, 32a) at a circulation speed that is greater than the speed of motion of the magnetic means so as to at least one of pre-heating of the magneto-calorific elements (60) of a thermal module (10) to modify an initial temperature of the magneto-calorific elements (60) at least one of before and during the magnetic field variation, before reaching the maximum field value in the thermal module (10), and pre-cooling of the magneto-calorific elements (60) of the thermal module (10) to modify an initial temperature of the magneto-calorific elements (60) at least one of before and during the magnetic field variation, before reaching the minimum field value in the thermal module (10).

16. The method according to claim 15, further comprising the steps of
moving the magnetic mechanism with respect to the magneto-calorific elements such that the magneto-calorific elements are sequentially subjected to the magnetic field variation;
arranging the at least one circulation channel of magneto-calorific elements such that the heat transfer fluid circulates in a direction that is parallel to a direction in which the magneto-calorific elements are sequentially subjected to the magnetic field variation; and
circulating the heat transfer fluid in the at least one circulation channel at a circulation speed that is greater than a speed at which the magneto-calorific elements are sequentially subjected to the magnetic field variation such that the initial temperatures of each of the magneto-calorific elements is sequentially modified before the magneto-calorific elements are sequentially subjected to the magnetic field variation.

17. The method according to claim 15, further comprising the step of measuring the circulation speed as a linear speed of movement of the heat transfer fluid.

* * * * *